United States Patent

Gelenius

[15] 3,659,177
[45] Apr. 25, 1972

[54] STEP MOTOR DRIVE CIRCUIT

[72] Inventor: Robert B. Gelenius, Davison, Mich.
[73] Assignee: General Motors Corporation, Detroit, Mich.
[22] Filed: Sept. 11, 1970
[21] Appl. No.: 71,397

[52] U.S. Cl.............................................318/696, 318/439
[51] Int. Cl. .......................................................H02k 37/00
[58] Field of Search....................318/138, 259, 696, 685, 439

[56] References Cited

UNITED STATES PATENTS

| | | | |
|---|---|---|---|
| 3,461,365 | 8/1969 | Newland et al........................ | 318/685 |
| 3,381,193 | 4/1968 | Smith...................................... | 318/696 |
| 3,385,984 | 5/1968 | O'Regan................................ | 318/696 |
| 3,443,182 | 5/1969 | Graham.................................. | 318/138 |

*Primary Examiner*—G. R. Simmons
*Attorney*—Eugene W. Christen, Creighton R. Meland and Richard G. Stahr

[57] ABSTRACT

A step motor drive circuit for use with a step motor of the type having three "wye" connected field coils, each of which is connected across a source of direct current supply potential through the collector-emitter electrodes of a respective transistor. The emitter-base electrodes of each transistor are connected across the source of direct current supply potential through a respective diode, a common series capacitor and a common electrical switch and also through the parallel combination of the other two motor field coils, each having a diode connected in series therewith which becomes reverse biased while the transistor through which that field coil is energized is conductive to interrupt that branch of the parallel combination. Circuitry responsive to the triggering of each not conductive transistor conductive upon each closure of the electrical switch for extinguishing the earlier conductive transistor of the other two is provided whereby each transistor is maintained not conductive while the other two transistors are conductive and each not conductive transistor is triggered conductive and the earlier conductive transistor of the other two transistors is extinguished upon each closure of the electrical switch.

5 Claims, 1 Drawing Figure

Patented April 25, 1972
3,659,177
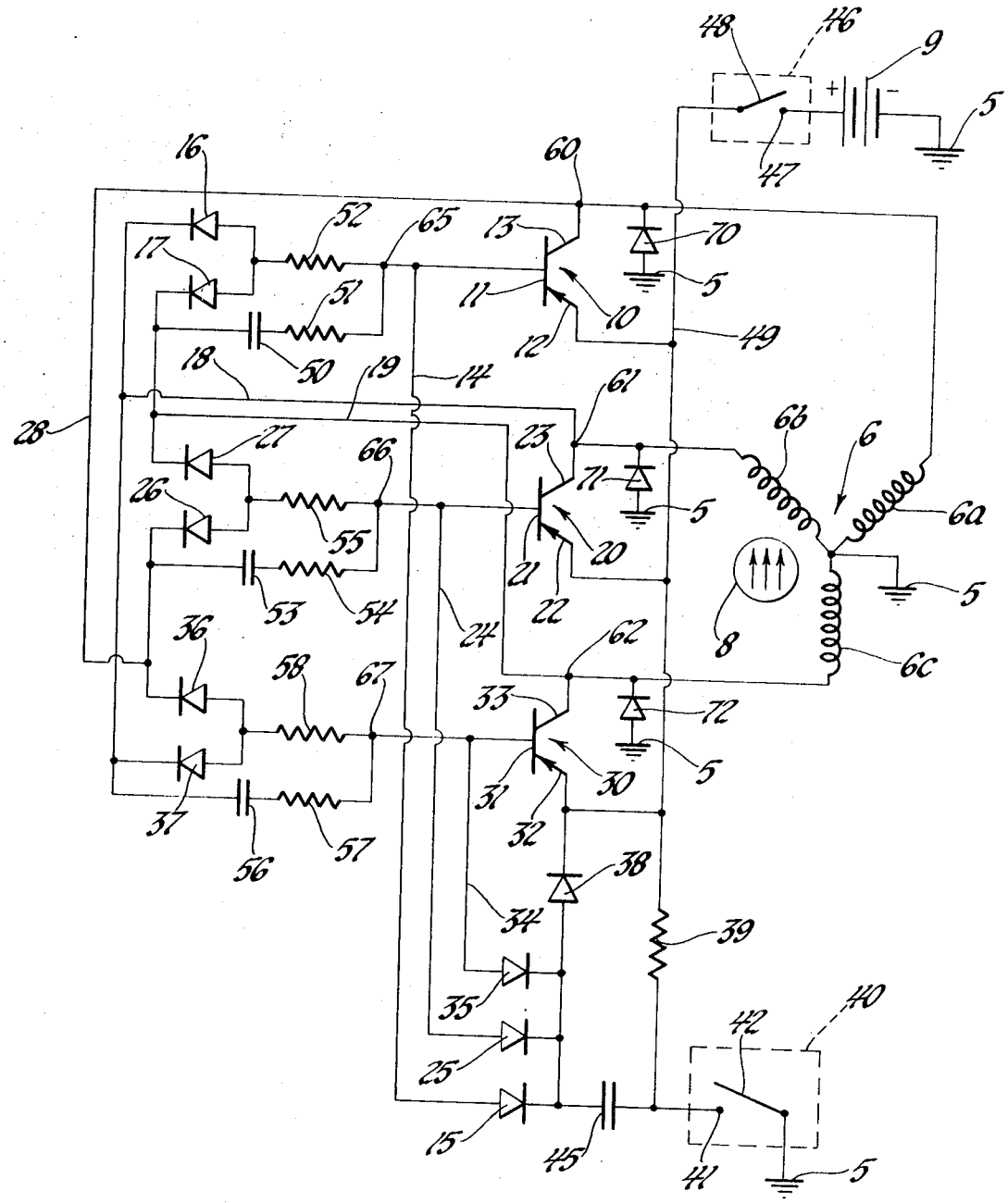
INVENTOR.
Robert B. Gelenius
BY
Richard G. Stahr
ATTORNEY

STEP MOTOR DRIVE CIRCUIT

This invention is directed to a step motor drive circuit and, more specifically, to a step motor drive circuit of the type which provides for the sequential energization of pairs of "wye" connected step motor field coils through respective transistors upon each closure of an associated electrical switching device.

With many applications it is desirable to rotate the rotor of a direct current energized step type motor in response to a series of closing operations of an electrical switching device at a speed proportional to the frequency of the electrical switching device closing operations.

It is, therefore, an object of this invention to provide an improved step motor drive circuit.

It is another object of this invention to provide an improved step motor drive circuit of the type which is responsive to a series of closing operations of an electrical switching device for driving the rotor of an associated step motor at a speed proportional to the frequency of the electrical switching device closing operations.

It is an additional object of this invention to provide an improved step motor drive circuit of the type which provides for the sequential energization of pairs of "wye" connected step motor field coils through respective transistors in response to a series of closing operations of an electrical switching device at a speed proportional to the frequency of the electrical switching device closing operations.

In accordance with this invention, a step motor drive circuit for use with a step motor of the type having three "wye" connected field coils is provided wherein each field coil is connected across a source of direct current supply potential through the collector-emitter electrodes of a respective transistor, the emitter-base electrodes of each of which are connected across the source of direct current supply potential through a respective diode, a common series capacitor which reverse biases the diodes when charged to interrupt these bias circuits and a common electrical switching device and also through the parallel combination of the other two motor field coils, each having a diode connected in series therewith which becomes reverse biased while the transistor through which that coil is energized is conductive whereby each transistor is maintained not conductive while the other two transistors are conductive and each not conductive transistor is triggered conductive upon each operation of the electrical switching device to the electrical circuit closed condition.

For a better understanding of the present invention, together with additional objects, advantages and features thereof, reference is made to the following description and accompanying single FIGURE drawing which sets forth the step motor drive circuit of this invention in schematic form.

In the FIGURE of the drawing, the point of reference or ground potential is indicated by the accepted schematic symbol and referenced by the numeral 5.

Referring to the FIGURE, the step motor drive circuit of this invention is set forth in schematic form in combination with a step motor 6 of the type having three "wye" connected field coils 6a, 6b and 6c and a source of direct current supply potential, which may be a conventional storage battery 9, and includes three type PNP transistors 10, 20 and 30 each having two current carrying electrodes and a control electrode and an electrical switching device 40 of the type operable to an electrical circuit closed condition.

The rotor 8 of the step motor 6 may be of the permanent magnet type which is magnetized in the direction indicated by the arrows in the FIGURE and the junction of the three field coils 6a, 6b and 6c may be connected to point of reference or ground potential 5.

Although the source of direct current supply potential has been indicated in the FIGURE as a battery 9, any suitable source of direct current potential may be employed.

For purposes of this specification and without intention or inference of the limitation thereto, electrical switching device 40 has been illustrated in the FIGURE as a single pole-single throw electrical switch having a stationary contact 41 and a movable contact 42. It is to be specifically understood, however, that any suitable electrical switching device which is operable to an electrical circuit closed condition may be substituted for switch 40 without departing from the spirit of the invention. For example, the current carrying electrodes of a transistor or the contacts of an electric relay may be substituted for contacts 41 and 42 of electrical switch 40.

Each one of motor field coils 6a, 6b and 6c and the current carrying electrodes of a respective one of transistors 10, 20 and 30 is connected in series across the source of direct current supply potential. Motor field coil 6a is connected in series with the current carrying electrodes, emitter electrode 12 and collector electrode 13 of transistor 10, motor field coil 6b is connected in series with the current carrying electrodes, emitter electrode 22 and collector electrode 23, of transistor 20, and motor field coil 6c is connected in series with the current carrying electrodes, emitter electrode 32 and collector electrode 33, of transistor 30, across battery 9 through stationary contact 47 and movable contact 48 of switch 46 when closed, positive polarity lead 49 and point of reference or ground potential 5.

A control bias circuit including electrical switching device 40 and a delay circuit responsive to the operation of electrical switching device 40 to the electrical circuit closed condition for interrupting the control bias circuit at the conclusion of a predetermined time delay after the operation of electrical switching device 40 to the electrical circuit closed condition is provided for connecting the control electrode and a selected one of the current carrying electrodes of each one of transistors 10, 20 and 30 across the source of direct current supply potential. The emitter electrode 12 and control or base electrode 11 of transistor 10, the emitter electrode 22 and control or base electrode 21 of transistor 20 and emitter electrode 32 and control or base electrode 31 of transistor 30 are connected across battery 9 through the contacts of switch 46 when closed, positive polarity lead 49, respective leads 14, 24 and 34, respective parallel diodes 15, 25 and 35, common capacitor 45, stationary contact 41 and movable contact 42 of electrical switching device 40 and point of reference or ground potential 5. Common capacitor 45 and diodes 15, 25 and 35 function as a delay circuit which is responsive to the operation of electrical switching device 40 to the electrical circuit closed condition for interrupting all of these bias circuits at the conclusion of a predetermined time delay after the operation of electrical switching device 40 to the electrical circuit closed condition in a manner to be explained in detail later in this specification.

An auxiliary bias circuit is also provided for each of transistors 10, 20 and 30 for connecting the control electrode and a selected one of the current carrying electrodes of each of one of transistors 10, 20 and 30 in series with the parallel combination of the other two motor field coils across the source of direct current supply potential. The emitter-base electrodes of transistor 10 are connected in series with the parallel combination of motor field coils 6b and 6c through respective parallel diodes 16 and 17 and respective leads 18 and 19 across battery 9 through switch 46 when closed, positive polarity lead 49 and point of reference or ground potential 5. The emitter-base electrodes of transistor 20 are connected in series with the parallel combination of motor field coils 6a and 6c through respective parallel diodes 26 and 27 and respective leads 28 and 19 across battery 9 through switch 46 when closed, positive polarity lead 49 and point of reference or ground potential 5. The emitter-base electrodes of transistor 30 are connected in series with the parallel combination of motor field coils 6a and 6b through respective parallel diodes 36 and 37 and respective leads 18 and 28 across battery 9 through switch 46 when closed, positive polarity lead 49 and point of reference or ground potential 5. Diodes 16 and 17, 26 and 27 and 36 and 37 included in each one of these circuits function to interrupt these auxiliary bias circuits while the other two transistors are conductive through the current carrying electrodes thereof in a manner to be explained in detail later in this specification.

So that the proper transistor may be extinguished upon each operation of electrical switching device 40 to the electrical circuit closed condition, circuitry responsive to the triggering of each not conductive transistor conductive upon each operation of electrical switching device 40 to the electrical circuit closed condition for extinguishing the earlier conductive one of the other two conductive transistors is provided. To extinguish respective transistors 10, 20 and 30 at the proper time, the series combination of capacitor 50 and resistor 51 is connected across diode 17 and resistor 52 in the base circuit of transistor 10, the series combination of capacitor 53 and resistor 54 is connected across diode 26 and resistor 55 in the base circuit of transistor 20 and the series combination of capacitor 56 and resistor 57 is connected across diode 37 and resistor 58 in the base circuit of transistor 30. The operation of these circuits will be described in detail later in this specification.

The emitter electrodes 12, 22 and 32 of respective type PNP transistors 10, 20 and 30 are connected to the positive polarity terminal of battery 9 through positive polarity lead 49 and the contacts of switch 46, the respective base electrodes 11, 21 and 31 are connected to the negative polarity terminal of battery 9 through respective parallel diodes 15, 25 and 35, common capacitor 45 and electrical switching device 40, when operated to the electrical circuit closed condition, and point of reference or ground potential 5, and the respective collector electrodes 13, 23 and 33 are connected to the negative polarity terminal of battery 9 through respective field coils 6a, 6b and 6c and point of reference or ground potential 5. Therefore, the potential of battery 9 is applied across the emitter-base electrodes and the emitter-collector electrodes of type PNP transistors 10, 20 and 30 in the proper polarity relationship to produce forward emitter-base conduction and forward emitter-collector conduction through these type PNP transistors.

Upon the closure of movable contact 48 of switch 46 to stationary contact 47 with electrical switch 40 open, the auxiliary bias circuit, previously described, for each of transistors 10, 20 and 30 is established for the flow of emitter-base current through each of transistors 10, 20 and 30 through the parallel combination of the other two motor field coils. Consequently, each of transistors 10, 20 and 30 is conditioned for emitter-collector conduction therethrough. However, because of different circuit parameter tolerances, two of transistors 10, 20 and 30 will conduct through the emitter-collector electrodes thereof at a time earlier than the third transistor. For purposes of this specification, it will be assumed that transistors 10 and 20 conduct through the emitter-collector thereof before transistor 30.

With transistors 10 and 20 conducting, the potential upon respective junctions 60 and 61 is of a positive polarity and of a magnitude equal to the supply potential less the emitter-collector drop of respective transistors 10 and 20. This positive polarity potential upon junction 60 reverse biases diode 26 in one parallel branch of the auxiliary emitter-base bias circuit of transistor 20 and diode 36 in one parallel branch of the auxiliary emitter-base bias circuit of transistor 30 and this positive polarity potential upon junction 61 reverse biases diode 16 in one parallel branch of the auxiliary emitter-base bias circuit of transistor 10 and diode 37 in the other parallel branch of the auxiliary emitter-base bias circuit of transistor 30. Therefore, transistor 30 is maintained not conductive while transistors 10 and 20 are conductive as both parallel branches of the auxiliary emitter-base bias circuit through which emitter-base current is supplied therefor with electrical switch 40 open is interrupted by reverse biased diodes 36 and 37. With transistor 10 not conductive, the potential upon junction 62 is substantially ground potential, consequently, diodes 17 and 27 in the other parallel branch of the auxiliary emitter-base bias circuits of respective transistors 10 and 20 are forward biased. Therefore, transistors 10 and 20 remain conductive as emitter-base current is supplied therefor through respective conducting diodes 17 and 27 and motor field coil 6c of the other parallel branch of each respective auxiliary emitter-base bias circuit for transistors 10 and 20. Consequently, the circuit stabilizes with two transistors conductive through the emitter-collector electrodes thereof and the third transistor not conductive. While transistor 10 is conductive, capacitor 50 charges through a circuit which may be traced from the positive polarity terminal of battery 9, through switch 46, positive polarity lead 49, the emitter-base electrodes of transistor 10, resistor 51, capacitor 50, lead 19, motor field coil 6c and point of reference or ground potential 5 to the negative polarity terminal of battery 9. Although transistor 20 is also conductive, capacitor 53 is prevented from charging by the positive polarity potential upon junction 60.

Conducting transistor 10 completes an energizing circuit for motor field coil 6a through a circuit which may be traced from the positive polarity terminal of battery 9, through closed switch 46, positive polarity lead 49, the emitter-collector electrodes of transistor 10, motor field coil 6a and point of reference or ground potential 5 to the negative polarity terminal of battery 9. Conducting transistor 20 completes an energizing circuit for motor field coil 6b through a circuit which may be traced from the positive polarity terminal of battery 9, through closed switch 46, positive polarity lead 49, the emitter-collector electrodes of transistor 20, motor field coil 6b and point of reference or ground potential 5 to the negative polarity terminal of battery 9.

Upon the operation of electrical switch 40 to the electrical circuit closed condition, the control bias circuit is established for the flow of emitter-base current through each of type PNP transistors 10, 20 and 30 which may be traced from the positive polarity terminal of battery 9, through the closed contacts of switch 46, positive polarity lead 49, the emitter-base electrodes of respective transistors 10, 20 and 30 in parallel, respective leads 14, 24 and 34, respective diodes 15, 25 and 35 in parallel, common capacitor 45, the closed contacts of electrical switch 40 and point of reference or ground potential 5 to the negative polarity terminal of battery 9. As transistors 10 and 20 are conductive upon the operation of electrical switch 40 to the electrical circuit closed condition, these transistors are maintained conductive and transistor 30 is triggered conductive through the emitter-collector electrodes thereof. Upon the conduction of transistor 30 through the emitter-collector electrodes, the potential upon junction 62 is of a positive polarity and of a magnitude substantially equal to the supply potential less the emitter-collector drop of transistor 30. Therefore, charged capacitor 50 discharges through resistors 51 and 52 and diode 17 to produce a potential drop across resistor 52 which is of a positive polarity upon the terminal end thereof connected to junction 65. Consequently, the potential upon junction 65 is of a positive polarity and of a magnitude equal to the supply potential less the emitter-base drop of transistor 10 plus the potential drop across resistor 52 produced by discharging capacitor 50. This positive polarity potential upon junction 65 quickly extinguishes earlier conducting transistor 10. While electrical switch 40 is in the electrical circuit closed condition, common capacitor 45 charges rapidly and, when fully charged, reverse biases all of diodes 15, 25 and 35 to interrupt the control bias circuit. Common capacitor 45 and diodes 15, 25 and 35, therefore, function as a delay circuit included in the control bias circuit responsive to the operation of the electrical switching device 40 to the electrical circuit closed condition for interrupting the control bias circuit at the conclusion of a predetermined time delay as determined by the time constant of the control bias circuit. While capacitor 45 is charging through the control bias circuit, transistor 10 is maintained not conductive by discharging capacitor 50 and transistors 20 and 30 are conductive. With transistor 10 not conductive and transistors 20 and 30 conductive, the potential upon junction 60 is substantially ground potential and the potential upon respective junctions 61 and 62 is of a positive polarity and of a magnitude substantially equal to the supply potential less the emitter-collector drop of respective transistors 20 and 30. This positive polarity potential upon junction 61 reverse biases diode 16 in one parallel branch of the auxiliary emitter-base bias circuit of transistor 10 and diode 37 in one parallel branch of the auxiliary emitter-base bias circuit of transistor 30 and this positive polarity potential upon junction 62 reverse biases diode 27 in one parallel branch of the auxiliary emitter-base bias circuit of transistor 20 and diode 17 in the other parallel branch of the auxiliary emitter-base bias circuit of transistor 10. The substantially ground potential upon junction 60 with transistor 10 not conductive forward biases diodes 26 and 36 in the other parallel branch of each auxiliary emitter-base bias circuit of respective transistors 20 and 30. Therefore, when common capacitor 45 has become fully charged to reverse bias diodes 15, 25 and 35 which interrupts the control bias circuit, electrical switch 40 may be operated to the electrical circuit open condition and transistors 20 and 30 remain conductive as emitter-base current is now supplied to these devices through each respective auxiliary emitter-base bias circuit which may be traced from the positive polarity terminal of battery 9 through the closed contacts of switch 46, positive polarity lead 49, the emitter-base electrodes of respective transistors 20 and 30, respective forward biased diodes 26 and 36, lead 28, motor field coil 6a and point of reference or ground potential 5 to the negative polarity terminal of battery 9. Transistor 10 is maintained not conductive by conducting transistors 20 and 30 as both parallel branches of the auxiliary emitter-base bias circuit therefor are interrupted by respective diodes 16 and 17 which are reverse biased by the positive polarity potential upon respective junctions 61 and 62. Capacitor 53 now charges through a circuit which may be traced from the positive polarity terminal of battery 9, through switch 46, positive polarity lead 49, the emitter-base electrodes of transistor 20, resistor 54, capacitor 53, lead 28, motor field coil 6a and point of reference or ground potential 5 to the negative polarity terminal of battery 9. Although transistor 30 is also conductive, capacitor 56 is prevented from charging by the positive polarity potential upon junction 61.

Conducting transistor 20 completes an energizing circuit for motor field coil 6b through a circuit which may be traced from the positive polarity terminal of battery 9, through closed switch 46, positive polarity lead 49, the emitter-collector electrodes of transistor 20, motor field coil 6b and point of reference or ground potential 5 to the negative polarity terminal of battery 9. Conducting transistor 30 completes an energizing circuit for motor field coil 6c through a circuit which may be traced from the positive polarity terminal of battery 9, through closed switch 46, positive polarity lead 49, the emitter-collector electrodes of transistor 30, motor field coil 6c and point of reference or ground potential 5 to the negative polarity terminal of battery 9 to produce counterclockwise rotation of rotor 8.

While electrical switch 40 is in the electrical circuit open condition, common capacitor 45 discharges through diode 38 and resistor 39 in preparation for the next operation of electrical switch 40 to the electrical circuit closed condition. The discharge of common capacitor 45 does not affect the system as it is isolated therefrom by reverse biased diodes 15, 25 and 35. Common capacitor 45, of course, will not discharge while electrical switch 40 is closed as diode 38 is reverse biased by the supply potential.

Upon the next operation of electrical switch 40 to the electrical circuit closed condition, the control bias circuit is established to maintain conducting transistors 20 and 30 conductive and trigger transistor 10 conductive in a manner previously explained. Upon the conduction of transistor 10 through the emitter-collector electrodes, the potential upon junction 60 is of a positive polarity and of a magnitude substantially equal to the supply potential less the emitter-collector drop of transistor 30. Therefore, charged capacitor 53 discharges through resistors 54 and 55 and diode 26 to produce a potential drop across resistor 55 which is of a positive polarity upon the terminal end thereof connected to junction 66. Consequently, the potential upon junction 66 is of a positive polarity and of a magnitude equal to the supply potential less the emitter-base drop of transistor 20 plus the potential drop across resistor 55 produced by discharging capacitor 53. This positive polarity potential upon junction 66 quickly extinguishes earlier conducting transistor 20. While electrical switch 40 is in the electrical circuit closed condition, common capacitor 45 charges rapidly and, when fully charged, reverse biases all of diodes 15, 25 and 35 to interrupt the control bias circuit. While capacitor 45 is charging through the control bias circuit, transistor 20 is maintained not conductive by discharging capacitor 53 and transistor 10 and 30 are conductive. With transistor 20 not conductive and transistors 10 and 30 conductive, the potential upon junction 61 is substantially ground potential and the potential upon respective junctions 60 and 62 is of a positive polarity and of a magnitude substantially equal to the supply potential less the emitter-collector drop of respective transistors 10 and 30. This positive polarity potential upon junction 60 reverse biases diode 26 in one parallel branch of the auxiliary emitter-base bias circuit of transistor 20 and diode 36 in one parallel branch of the auxiliary emitter-base bias circuit of transistor 30 and this positive polarity potential upon junction 62 reverse biases diode 17 in one parallel branch of the auxiliary emitter-base bias circuit of transistor 10 and diode 27 in the other parallel branch of the auxiliary emitter-base bias circuit of transistor 20. The substantially ground potential upon junction 61 with transistor 20 not conductive forward biases diodes 17 and 37 in the other parallel branch of each auxiliary emitter-base bias circuit of respective transistors 10 and 30. Therefore, when common capacitor 45 has become fully charged to reverse bias diodes 15, 25 and 35 which interrupts the control bias circuit, electrical switch 40 may be operated to the electrical circuit open condition and transistors 10 and 30 remain conductive as emitter-base current is now supplied to these devices through each respective auxiliary emitter-base bias circuit. Transistor 20 is maintained not conductive by conducting transistors 10 and 30 as both parallel branches of the auxiliary emitter-base bias circuit therefor are interrupted by respective diodes 26 and 27 which are reverse biased by the positive polarity potential upon respective junctions 60 and 62. Capacitor 56 now charges through a circuit which may be traced from the positive polarity terminal of battery 9, through switch 46, positive polarity lead 49, the emitter-base electrodes of transistor 30, resistor 57, capacitor 56, lead 18, motor field coil 6b and point of reference or ground potential 5 to the negative polarity terminal of battery 9. Although transistor 10 is also conductive, capacitor 50 is prevented from charging by the positive polarity potential upon junction 62.

Conducting transistor 10 completes an energizing circuit for motor field coil 6a through a circuit which may be traced from the positive polarity terminal of battery 9, through closed switch 46, positive polarity lead 49, the emitter-collector electrodes of transistor 10, motor field coil 6a and point of reference or ground potential 5 to the negative polarity terminal of battery 9. Conducting transistor 30 completes an energizing circuit for motor field coil 6c through a circuit which may be traced from the positive polarity terminal of battery 9, through closed switch 46, positive polarity lead 49, the emitter-collector electrodes of transistor 30, motor field coil 6c and point of reference or ground potential 5 to the negative polarity terminal of battery 9 to produce counterclockwise rotation of rotor 8.

Upon the next operation of electrical switch 40 to the electrical circuit closed condition, the control bias circuit is established to maintain conducting transistors 10 and 30 conductive and trigger transistor 20 conductive in a manner previously explained. Upon the conduction of transistor 20 through the emitter-collector electrodes, the potential upon junction 61 is of a positive polarity and of a magnitude substantially equal to the supply potential less the emitter-collector drop of transistor 30. Therefore, charged capacitor 56 discharges through resistors 57 and 58 and diode 37 to produce a potential drop across resistor 58 which is of a positive polarity upon the terminal end thereof connected to junction 67. Consequently, the potential upon junction 67 is of a positive polarity and of a magnitude equal to the supply potential less the emitter-base drop of transistor 30 plus the potential drop across resistor 58 produced by discharging capacitor 56. This positive polarity potential upon junction 67 quickly extinguishes earlier conducting transistor 30. While electrical switch 40 is in the electrical circuit closed condition, common capacitor 45 charges rapidly and, when fully charged, reverse biases all of diodes 15, 25 and 35 to interrupt the control bias circuit. While capacitor 45 is charging through the control bias circuit, transistor 30 is maintained not conductive by discharging capacitor 56 and transistors 10 and 20 are conductive. With transistor 30 not conductive and transistors 10 and 20 conductive, the potential upon junction 62 is substantially ground potential and the potential upon respective junctions 60 and 61 is of a positive polarity and of a magnitude substantially equal to the supply potential less the emitter-collector drop of respective transistors 10 and 20. This positive polarity potential upon junction 60 reverse biases diode 26 in one parallel branch of the auxiliary emitter-base bias circuit of transistor 20 and diode 36 in one parallel branch of the auxiliary emitter-base bias circuit of transistor 30 and this positive polarity potential upon junction 61 reverse biases diode 16 in one parallel branch of the auxiliary emitter-base bias circuit of transistor 10 and diode 37 in the other parallel branch of the auxiliary emitter-base circuit of transistor 30. The substantially ground potential upon junction 62 with transistor 30 not conductive forward biases diodes 17 and 27 in the other parallel branch of each auxiliary emitter-base bias circuit of respective transistors 10 and 20. Therefore, when common capacitor 45 has become fully charged to reverse bias diodes 15, 25 and 35 which interrupts the control bias circuit, electrical switch 40 may be operated to the electrical circuit open condition and transistors 10 and 20 remain conductive as emitter-base current is now supplied to these devices through each respective auxiliary emitter-base bias circuit. Transistor 30 is maintained not conductive by conducting transistors 10 and 20 as both parallel branches of the auxiliary emitter-base bias circuit therefor are interrupted by respective diodes 36 and 37 which are reverse biased by the positive polarity potential upon respective junctions 60 and 61. Capacitor 50 now charges through a circuit previously described and capacitor 53 is prevented from charging by the positive polarity potential present upon junction 60.

Conducting transistors 10 and 20 complete respective energizing circuits for motor field coils 6a and 6b as previously described to produce counterclockwise rotation of rotor 8.

From this description of the step motor drive circuit of this invention, it is evident that, upon each operation of electrical switching device 40 to the electrical circuit closed condition, rotor 8 of step motor 6 is incrementally rotated 120° in a counterclockwise direction. To produce clockwise direction of rotor 8, the leads to any two of the field coils may be interchanged.

Connected across the collector electrode of each of transistors 10, 20 and 30 and point of reference or ground potential 5 is a respective diode 70, 71 and 72. These diodes suppress the transient potentials generated when the respective motor field coils are switched.

While specific electrical devices, transistor types and electrical polarities have been set forth in this specification, it is to be specifically understood that alternate electrical devices possessing similar electrical characteristics, alternate transistor types and compatible electrical polarities may be employed without departing from the spirit of the invention.

While a preferred embodiment of the present invention has been shown and described, it will be obvious to those skilled in the art that various modifications and substitutions may be made without departing from the spirit of the invention which is to be limited only within the scope of the appended claims.

What is claimed is:

1. A step motor drive circuit comprising in combination with a step motor of the type having three "wye" connected field coils and a source of direct current supply potential, first, second and third transistors each having two current carrying electrodes and a control electrode, means for connecting each one of said motor field coils and said current carrying electrodes of a respective one of said transistors in series across said source of direct current supply potential, an electrical switching device of the type operable to an electrical circuit closed condition, control bias circuit means including said electrical switching device for connecting said control electrode and a selected one of said current carrying electrodes of each one of said transistors across said source of direct current supply potential, delay circuit means included in said control bias circuit means responsive to the operation of said electrical switching device to the electrical circuit closed condition for interrupting said control bias circuit means at the conclusion of a predetermined time delay, auxiliary bias circuit means for connecting said control electrode and a selected one of said current carrying electrodes of each one of said transistors in series with the parallel combination of the other two said motor field coils across said source of direct current supply potential, and means included in each one of said auxiliary bias circuit means for interrupting said auxiliary bias circuit means while the other two of said transistors are conducting through said current carrying electrodes thereof.

2. A step motor drive circuit comprising in combination with a step motor of the type having three "wye" connected field coils and a source of direct current supply potential, first, second and third transistors each having base, emitter and collector electrodes, means for connecting each one of said motor field coils and said collector-emitter electrodes of a respective one of said transistors in series across said source of direct current supply potential, an electrical switching device of the type operable to an electrical circuit closed condition, control bias circuit means including said electrical switching device for connecting said emitter-base electrodes of each one of said transistors across said source of direct current supply potential, delay circuit means included in said control bias circuit means responsive to the operation of said electrical switching device to the electrical circuit closed condition for interrupting said control bias circuit means at the conclusion of a predetermined time delay, auxiliary bias circuit means for connecting said emitter-base electrodes of each one of said transistors in series with the parallel combination of the other two said motor field coils across said source of direct current supply potential, and means included in each one of said auxiliary bias circuit means for interrupting said auxiliary bias circuit means while the other two of said transistors are conducting through said current carrying electrodes thereof.

3. A step motor drive circuit comprising in combination with a step motor of the type having three "wye" connected field coils and a source of direct current supply potential, first, second and third transistors each having two current carrying electrodes and a control electrode, means for connecting each one of said motor field coils and said current carrying electrodes of a respective one of said transistors in series across said source of direct current supply potential, first, second and third diodes, an electrical switching device of the type operable to an electrical circuit closed condition, control bias circuit means including said electrical switching device for connecting said control electrode and a selected one of said current carrying electrodes of each one of said transistors and a respective one of said first, second and third diodes in series across said source of direct current supply potential, delay circuit means included in said control bias circuit means responsive to the operation of said electrical switching device to the electrical circuit closed condition for reverse biasing all of said first, second and third diodes at the conclusion of a predetermined time delay, fourth, fifth, sixth, seventh, eighth and ninth diodes, and auxiliary bias circuit means for connecting said control electrode and a selected one of said current carrying electrodes of each one of said transistors in series with the parallel combination of each one of the other two said motor field coils and a respective one of said fourth, fifth, sixth, seventh, eighth and ninth diodes connected in series therewith across said source of direct current supply potential.

4. A step motor drive circuit comprising in combination with a step motor of the type having three "wye" connected field coils and a source of direct current supply potential, first, second and third transistors each having base, emitter and collector electrodes, means for connecting each one of said motor field coils and said collector-emitter electrodes of a respective one of said transistors in series across said source of direct current supply potential, first, second and third diodes, an electrical switching device of the type operable to an electrical circuit closed condition, control bias circuit means including said electrical switching device for connecting said emitter-base electrodes of each one of said transistors and a respective one of said first, second and third diodes in series across said source of direct current supply potential, delay circuit means included in said control bias circuit means responsive to the operation of said electrical switching device to the electrical circuit closed condition for reverse biasing all of said first, second and third diodes at the conclusion of a predetermined time delay, fourth, fifth, sixth, seventh, eighth and ninth diodes, and auxiliary bias circuit means for connecting said emitter-base electrodes of each one of said transistors in series with the parallel combination of each one of the other two said motor field coils and a respective one of said fourth, fifth, sixth, seventh, eighth and ninth diodes connected in series therewith across said source of direct current supply potential.

5. A step motor drive circuit comprising in combination with a step motor of the type having three "wye" connected field coils and a source of direct current supply potential, first second and third transistors each having base, emitter and collector electrodes, means for connecting each one of said motor field coils and said collector-emitter electrodes of a respective one of said transistors in series across said source of direct current supply potential, first, second and third diodes, an electrical switching device of the type operable to an electrical circuit closed condition, control bias circuit means including said electrical switching device for connecting said emitter-base electrodes of each one of said transistors and a respective one of said first, second and third diodes in series across said source of direct current supply potential, delay circuit means included in said control bias circuit means responsive to the operation of said electrical switching device to the electrical circuit closed condition for reverse biasing all of said first, second and third diodes at the conclusion of a predetermined time delay, fourth, fifth, sixth, seventh, eighth and ninth diodes, auxiliary bias circuit means for connecting said emitter-base electrodes of each one of said transistors in series with the parallel combination of each one of the other two said motor field coils and a respective one of said fourth, fifth, sixth, seventh, eighth and ninth diodes connected in series therewith across said source of direct current supply potential, and means responsive to the triggering of each not conducting transistor conductive upon each operation of said electrical switching device to electrical circuit closed condition for extinguishing the earlier conductive one of said other two conducting transistors.

* * * * *